United States Patent [19]
Byrd

[11] Patent Number: 5,264,886
[45] Date of Patent: Nov. 23, 1993

[54] FILM EXPOSURE INDICATOR AND PROCESS

[76] Inventor: Ima J. Byrd, 332 Fox Hill Rd., Hampton, Va. 23669

[21] Appl. No.: 951,817

[22] Filed: Sep. 28, 1992

[51] Int. Cl.$^5$ ............................................. G03B 17/26
[52] U.S. Cl. ................................................... 354/275
[58] Field of Search ............................ 354/275, 289.1

[56] References Cited

U.S. PATENT DOCUMENTS

| | | | |
|---|---|---|---|
| 3,768,894 | 10/1973 | Cook | 354/275 |
| 4,418,037 | 11/1983 | Katsuyama | 422/56 |
| 4,758,851 | 7/1988 | Zeth | 354/72 |
| 4,860,892 | 8/1989 | Roberts | 354/75 |
| 4,876,123 | 10/1989 | Rivera | 428/916 |
| 4,887,110 | 12/1989 | Harvey | 354/275 |
| 4,894,673 | 1/1990 | Beach | 354/275 |
| 4,965,600 | 10/1990 | Smart et al. | 354/275 X |
| 5,047,794 | 9/1991 | Pagano et al. | 354/275 |

*Primary Examiner*—Michael L. Gellner
*Assistant Examiner*—Jae N. Noh
*Attorney, Agent, or Firm*—Wallace J. Nelson

[57] ABSTRACT

A system and process are disclosed for providing visual indication that a roll of photographic film has/has not been previously exposed to thereby reduce the likelihood of double exposure or the expense of processing unexposed film. A removable, color coded, plastic strip, cover is provided over at least a portion of the starter tab of film extending from a film canister. The presence of this cover gives visual indication that the film has not been previously exposed and prevents camera loading while in place. Instructions on the cover, or provided separately, warn that the cover should not be removed until ready to load the camera and that the film cannot be loaded until cover removal. The absence of the cover is visual indication that the film probably has been exposed. Additional exposure indicia may also be employed on the film canister and/or on the tab extension and is obscured from view when the color coded cover is in place.

11 Claims, 2 Drawing Sheets

FILM EXPOSURE INDICATOR AND PROCESS

FIELD OF THE INVENTION

This invention relates generally to photographic film and relates specifically to an indicator system and process for giving instant visual indication if a roll of photographic film has/has not been exposed.

BACKGROUND OF THE INVENTION

Photographic film, particularly that for the popular 35 mm camera, is frequently purchased in multiple-roll packages. Once the original package is opened, the additional rolls not immediately used are conventionally stored in a camera bag, drawer, or on a shelf until ready for use. Each of these film rolls or canisters is provided with a starter tab extension of film protruding therefrom. These tab extensions are provided with a series of equally spaced sprocket holes along at least one edge thereof for engaging the film advancing mechanism of the camera. Once the camera has been used to expose the individual film frames, the film is rewound before being removed from the camera for processing. When rewound, the canister of film has the same visual appearance as the unexposed film with the same tab of film again protruding therefrom.

Frequently, an exposed roll of film is removed from the camera and also placed in the camera bag, drawer, or on a shelf prior to taking or sending it to a processor. This often happens when numerous pictures are taken on festive occasions such as at weddings, birthday celebrations, family and/or class reunions, or while on vacation trips. Since both the unexposed film canister and the exposed canister of film are of identical appearance, it is not uncommon for a previously exposed roll of film to be again inserted in the camera and double exposed. This, obviously, destroys what was, or could have been, priceless memories. Also, an unexposed roll of film may inadvertently be sent to the processor resulting in loss of the film and processing costs.

Thus, there is a definite need in the art for a system or process for reducing the chances of double exposure of film and unnecessary expenses involved in processing of unexposed film.

It is therefore an object of the present invention to provide a visual indicator for photographic film that reduces the risk of double exposure of the film.

Another object of the present invention is to provide visual indication on a roll of photographic film that the film has/has not been exposed.

A further object of the present invention is a process of providing visual indication on a roll of photographic film that the film has/has not been exposed.

An additional object of the present invention is to provide a photographic film indicator that reduces the risk of having an unexposed roll of film processed.

SUMMARY OF THE INVENTION

According to the present invention, the foregoing and additional objects are attained by employing a removable, color coded, cover to the starting tab of film extending from a photographic film canister. The presence of this color coded cover gives immediate visual indication that the roll of film is unexposed and, when removed or absent from the starter tab of film, gives immediate indication that the roll of film probably has been exposed and is ready for processing. In practice of the invention, a strip of color coded tape, provided with a pressure sensitive adhesive surface, is secured to at least a portion of the starter tab of film extending from the film canister, and in some instances, also secured to a portion of the photographic film canister.

The color coded tape is smooth, solid, and spans the tab and its sprocket holes along the side thereof to thereby prevent loading of the film into a camera until the tape is removed. Instructions are provided with the film advising that the color coded tape should not be removed until the film is to be loaded in the camera. These instructions may be a separate printed message, or printed directly on the color coded tape strip. Thus, any film having the color coded tape removed may be safely presumed to have been exposed in the camera and ready for processing.

To enhance the visual determination that a film has/has not been exposed, the color coded tape is provided with a first color and, at least a portion of the film starter tab is provided with a second and sharply contrasting color. Also, suitable exposure informational indicia may be imprinted on the starter tab of tape in lieu of, or in addition to, the contrasting color.

BRIEF DESCRIPTION OF THE DRAWINGS

A more complete appreciation of the invention and many of the advantages thereof will become more readily apparent as the same becomes better understood when considered in connection with the accompanying drawings wherein.

DETAILED DESCRIPTION

Figure 1:
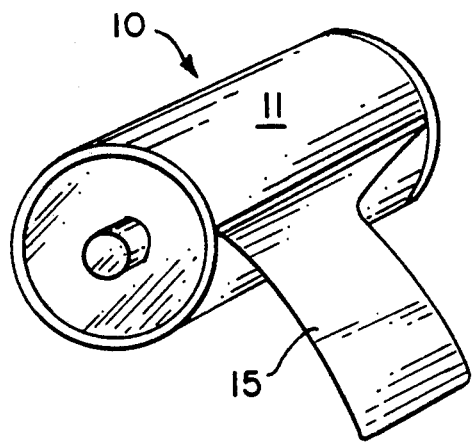
FIG. 1 is a perspective view of an exemplary roll or canister of photographic film employing the visual exposure indicator attachment cover of the present invention.
Figure 2:
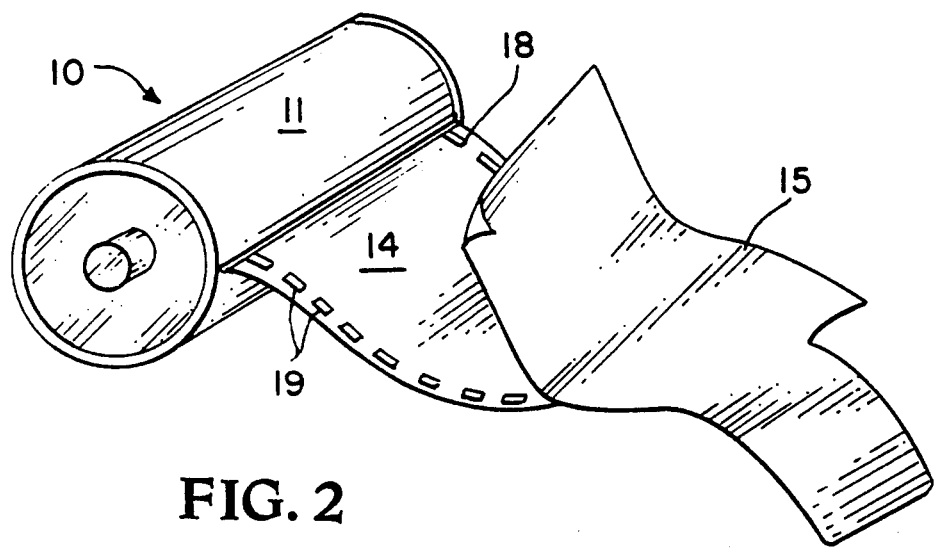
FIG. 2 is a view of the film canister shown in FIG. 1 with the visual exposure indicator attachment cover being partially removed.
Figure 3:
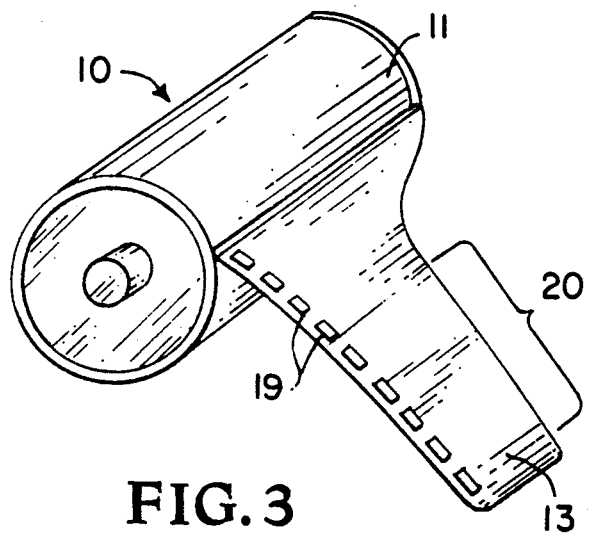
FIG. 3 is view of the film canister shown in FIGS. 1 and 2 with the visual exposure indicator attachment cover being completely removed.

Referring now to the drawings and more particularly to FIGS. 1-3, the preferred embodiment of the film tab indicator system of the present invention is shown and designated generally by reference numeral 10. Indicator system 10 includes a film canister 11 having a short starter tab of film 13 (FIG. 3) extending therefrom to assist in loading the film in a camera. Starter tab 13 is integral with and tapers to a reduced diameter from the main body of film 14 contained within canister 11. In FIG. 1 this shorter tab 13 is covered by a removable, color coded, plastic tape strip 15.

Color coded, plastic tape strip 15, as the name implies, is of a highly visible and contrasting color to that of film tab 13. Thus, when the color coded tape 15 is seen, it gives immediate indication that film 14 contained within canister 11 is unexposed and may be confidently inserted into a camera. The contrasting color provided for tab 13 is also highly visible and, when seen, a presumption may be made that the film in canister 11 has been exposed. Film 15 is conventionally provided with a row of sprocket engaging holes along each edge thereof, as shown in FIG. 2, and designated by reference numerals 18, 19. These sprocket engaging holes serve to facilitate movement of the film by the film advancing mechanism in the camera.

Sprocket holes in row 19 extend the length of tab 13 while row 18 is terminated at the tapered start of the reduced width tab 13. Color coded plastic tape strip 15 covers sprocket holes 19 on tab 13 and may also extend to cover a portion of row 18.

When it is desired to load a camera with film 14, the tab 13 may be manually grasped to extend the length of film 14 to a length of two-three inches from canister 11, in a conventional manner. This moves plastic strip 15 away from canister 11 and it is then easily stripped from, and exposes, tab 13 (FIG. 2). Until tape strip 15 is removed, no sprocket engaging holes are exposed and the film cannot be loaded or "threaded" into the film advancing mechanism of the camera.

In a specific embodiment of the present invention, it was contemplated that plastic strip 15 would be provided with a bright or fluorescent blue color while a bright yellow color was contemplated for all or at least a portion of tab 13, as indicated by the area denoted by bracket 20 (FIG. 3). Other contrasting colors could obviously be employed for these components, if so desired, and more, less, or no area of tab 13 could be color coded. In the latter situation the natural color of film tab 13 could be deemed sufficiently contrasting to color coded plastic tape strip 15 to serve the purposes intended.

Figure 4:
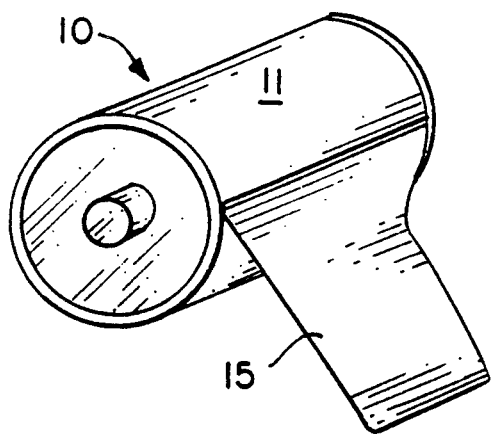
FIG. 4 is a view similar to FIG. 1 and illustrating an alternate indicator cover disposed on the film tab.
Figure 5:
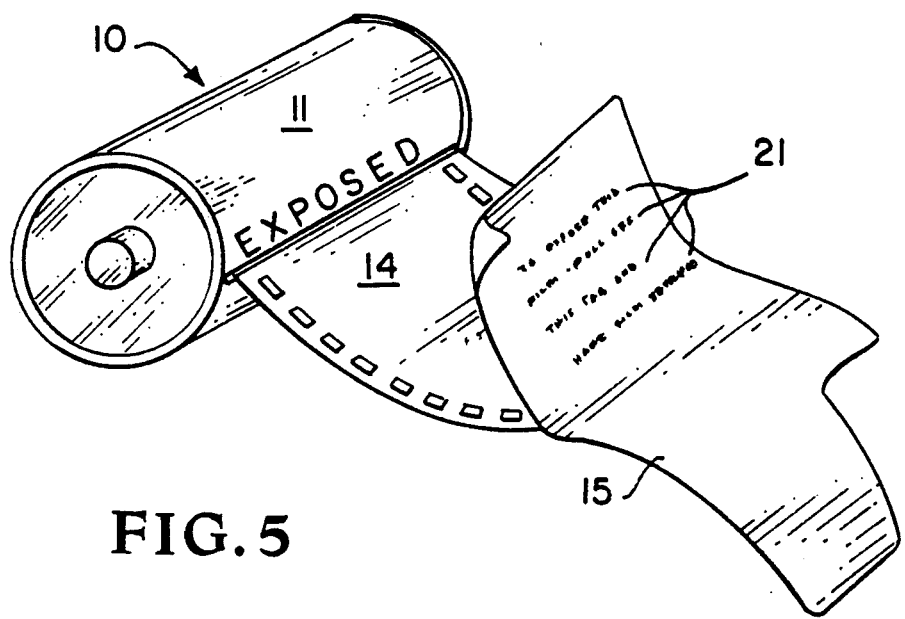
FIG. 5 is a view of the film canister shown in FIG. 4 with the visual exposure indicator attachment cover being partially removed and illustrating exposure informational indicia on the film canister.

Referring now more particularly to FIGS. 4 and 5, an alternate embodiment of the invention is shown. In this embodiment, color coded plastic tape strip 15 completely covers tab 13 and any of film 14 extending from canister 11. In addition, tape strip 15 covers a portion of canister 11. When tape strip 15 is removed (FIG. 5) the word "EXPOSED", imprinted on canister 11, is also visible to give additional visible indication that the film in canister 11 has probably been exposed and is ready for development. This indicia may be employed in lieu of, or in addition to, the color coding provided on tape strip 15 and film starter tab 13.

Figure 6:
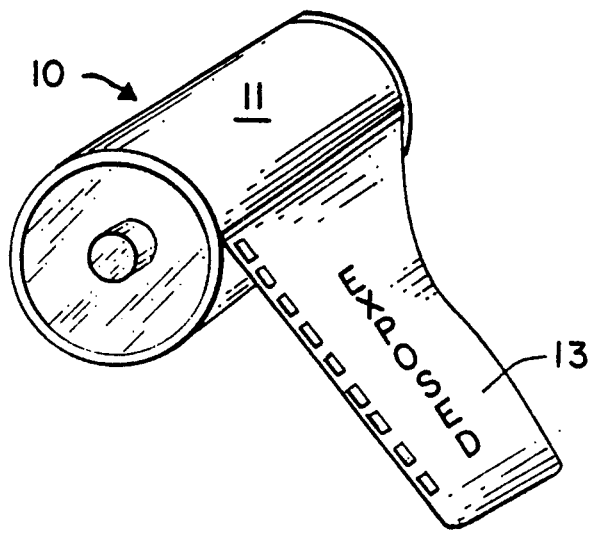
FIG. 6 is a view of a film canister similar to FIG. 3 and illustrating another alternate indicator disposed on the film tab.

Another alternate visual indicator is illustrated in FIG. 6 wherein the word "EXPOSED" is imprinted directly onto tab 13 and is visible only after removal of plastic tape strip 15.

As schematically illustrated by lines 21 in FIG. 5, suitable instructions may be imprinted on color coded plastic strip 15. These instructions would direct the film purchaser, or user, that the removable color coded plastic strip 15 should be removed only immediately prior to loading the camera and could possibly read:

"WARNING: This plastic color coded strip should be removed *only* when ready to load the film in a camera and *must* be removed before the camera can be loaded".

This, or a similar or different worded message(s) may be imprinted on each of the tape strip 15 embodiments of the invention shown and described herein. In addition, separate printed instructions may be packaged with the film canisters. Also, additional or different indicia may be provided on canister 11 (FIG. 5) or starter tab 13, to indicate if the film therein has/has not been exposed.

The embodiments of the invention shown and described herein are to, therefore, be considered exemplary only and are not to deemed as exhaustive. Thus, although the invention has been described relative to specific embodiments, it is not so limited and there are numerous variations and modifications therein that will be readily apparent to those skilled in the art in the light of the above teachings. One such apparent modification would involve having printed directly on plastic strip 15 the word "UNEXPOSED" and when plastic strip 15 is removed and discarded, revealing the word "EXPOSED" on starter tab 13 or on canister 11. Other modifications of the inventive concept will be apparent to those skilled in the art.

Thus, within the scope of the appended claims, the invention may be practiced other than as specifically described herein.

What is claimed as new and desired to be secured by Letters Patent of the United States is:

1. In combination, a roll of photographic film disposed in a film canister and a starting tab of film extending therefrom;
   indicating means on said starting tab to provide visual indication that the film contained within the canister has/has not been exposed;
   said indicating means including a color coded cover removably secured to at least a portion of said starting tab of film;
   color coded indicator means forming a part of said starting tab of film;
   said color coded indicator means being obscured from view by said color coded cover until said color coded cover is removed from said starting tab of film;
   said color coded cover and said color coded indicator means being of different and contrasting colors to thereby give visual indication that the cover has or has not been removed and that the film in the canister has, or has not, been previously exposed.

2. The combination of claim 1 wherein said color coded cover is a plastic tape strip;
   said plastic tape strip being removably secured by a pressure sensitive adhesive coating to said starter tab of film; and
   said color coded indicator means permanently forming a part of said starting tab of film and being selected from the group of indicators consisting of
   (a) indicia imprinted on said starting tab, and
   (b) a color coded segment of film forming part of said starting tab.

3. The visual indicating means of claim 1 wherein said color coded cover is a plastic tape strip adhesively secured to the film canister and starting tab of film and wherein said plastic strip covers the entire starting tab of film.

4. The visual indicating means of claim 1 wherein said starting tab of film is provided with informational indicia thereon; said informational indicia being obscured from view by said plastic strip when said plastic strip covers said starting tab of film and said informational indicia being exposed to view when said plastic strip is removed therefrom.

5. The visual indicating means of claim 1 wherein said canister is provided with indicia thereon indicating that the roll of film has been exposed and wherein said plastic strip adhesively secured to the film canister obscures said indicia from view when secured to said canister and reveals said indicia when removed therefrom to thereby give additional indication that the film in the canister has probably been previously exposed.

6. A method of providing visual indication as to whether a canister of photographic film has or has not been previously exposed comprising, the steps of:
   providing a canister of photographic film having a starting tab of film extending therefrom;
   providing a removable cover indicator on at least a portion of the starting tab of film wherein the presence of the removable cover indicator provides visual indication that the canister of film has not been exposed; and
   immediately before loading the canister of film into a camera, removing the removable cover indicator; whereby,
   when the canister of film is removed from the camera, the absence of the removable cover provides visual indication that the canister of film has been exposed.

7. The method of claim 6 wherein indicia is imprinted on the canister of film indicating that the film has been exposed and wherein the indicia is initially covered by the removable cover indicator and brought to view when the removable cover is removed immediately before loading the canister of film into the camera.

8. The method of claim 6 including providing indicia on the starting tab of film indicating that the film has been exposed and wherein the indicia is initially covered by the removable cover indicator and brought to view when the removable cover is removed immediately before loading the canister of film into the camera.

9. In combination, a roll of photographic film disposed in a film canister and having a starting tab of film extending therefrom:
   indicating means on the film canister to provide visual indication that the film contained therein has/has not been exposed;
   said indicating means including indicia on said canister;
   color coded cover means normally obscuring said indicia from view and adapted to reveal said indicia when removed; and
   said color coded cover means being adapted to be removed immediately prior to loading said film canister in a camera to thereby reveal said indicia and give visual indication when the canister of film is removed from the camera that the film therein has been exposed.

10. The combination of claim 9 wherein said color coded cover means also extends over at least a portion of said starting tab;
    said starting tab and said color coded cover means each being provided with contrasting colors to thereby give visual indication that the film in the canister has not been exposed when said cover means is in covering position and visual indication that the film has probably been exposed when said cover means has been removed to reveal said starting tab.

11. The combination of claim 10 including exposure informational indicia on said starting tab; said exposure informational indicia being obscured from view when said color coded cover means is disposed on said starting and visible when said color coded cover means is removed to thereby give further visible indication that the canister of film has or has not been exposed.

* * * * *